United States Patent
Koshizuka et al.

(10) Patent No.: US 9,425,615 B2
(45) Date of Patent: Aug. 23, 2016

(54) INRUSH CURRENT SUPPRESSION APPARATUS

(71) Applicant: Kabushiki Kaisha Toshiba, Minato-ku (JP)

(72) Inventors: Tadashi Koshizuka, Saitama (JP); Minoru Saito, Kamakura (JP); Shiro Maruyama, Yokohama (JP); Hiroyuki Maehara, Fuchu (JP); Yoshimasa Sato, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 208 days.

(21) Appl. No.: 14/029,272

(22) Filed: Sep. 17, 2013

(65) Prior Publication Data

US 2014/0016235 A1 Jan. 16, 2014

Related U.S. Application Data

(63) Continuation of application No. PCT/JP2012/054982, filed on Feb. 28, 2012.

(30) Foreign Application Priority Data

Mar. 17, 2011 (JP) .................................. 2011-059820

(51) Int. Cl.
*H02H 9/04* (2006.01)
*H01H 9/56* (2006.01)
(Continued)

(52) U.S. Cl.
CPC ............. *H02H 9/045* (2013.01); *H01H 9/563* (2013.01); *H01H 33/593* (2013.01); *H02H 9/001* (2013.01)

(58) Field of Classification Search
CPC ..... H01H 9/563; H01H 33/593; H02H 9/001; H02H 9/045
USPC .......................................................... 361/56
See application file for complete search history.

(56) References Cited

U.S. PATENT DOCUMENTS

| 6,392,390 B1 | 5/2002 | Ito et al. |
| 2009/0134862 A1* | 5/2009 | Kinoshita et al. ............ 323/361 |
| 2013/0300215 A1 | 11/2013 | Koshizuka et al. |

FOREIGN PATENT DOCUMENTS

| CN | 1558482 A | 12/2004 |
| CN | 101447664 A | 6/2009 |

(Continued)

OTHER PUBLICATIONS

International Search Report mailed Jun. 5, 2012 for PCT/JP2012/054982 filed Feb. 28, 2012 with English Translation.

(Continued)

*Primary Examiner* — Rexford Barnie
*Assistant Examiner* — Thai Tran
(74) *Attorney, Agent, or Firm* — Oblon, McClelland, Maier & Neustadt, L.L.P.

(57) ABSTRACT

According to one embodiment, there is provided an inrush current suppression apparatus that suppresses an inrush current generated when shunt capacitors are connected to a power system. The apparatus includes a power supply voltage measurement unit measuring a power supply voltage, a circuit breaker current measurement unit measuring a circuit breaker current, a residual voltage polarity determination unit determining the polarities of three phases of a residual voltage, a specific phase determination unit determining a specific phase, a closing phase detector detecting a closing phase, and a circuit breaker closing unit closing the circuit breaker in the closing phase.

16 Claims, 8 Drawing Sheets

(51) Int. Cl.
*H01H 33/59* (2006.01)
*H02H 9/00* (2006.01)

(56) References Cited

FOREIGN PATENT DOCUMENTS

| CN | 101563744 A | | 10/2009 |
|---|---|---|---|
| JP | 2002-75145 A | | 3/2002 |
| JP | 2007-305491 A | | 11/2007 |
| JP | 2007305491 A | * | 11/2007 |
| JP | 2008-153037 A | | 7/2008 |
| WO | WO 00/04564 A1 | | 1/2000 |

OTHER PUBLICATIONS

International Written Opinion mailed Jun. 5, 2012 for PCT/JP2012/054982 filed Feb. 28, 2012.

"Breaking Conditions of Large-capacitance Circuit Breaker", Technical Report of the Institute of Electrical Engineers of Japan, The Institute of Electrical Engineers of Japan, 1991, Part II, No. 388, pp. 36-38 (with English language translation).

Combined Office Action and Search Report issued Dec. 31, 2014 in Chinese Patent Application No. 201280004125.0 (with English language translation).

* cited by examiner

INRUSH CURRENT SUPPRESSION APPARATUS

CROSS REFERENCE TO RELATED APPLICATIONS

This application is a Continuation application of PCT Application No. PCT/JP2012/054982, filed Feb. 28, 2012 and based upon and claiming the benefit of priority from Japanese Patent Application No. 2011-059820, filed Mar. 17, 2011, the entire contents of all of which are incorporated herein by reference.

FIELD

Embodiments described herein relate generally to an inrush current suppression apparatus that suppresses an inrush current generated when a circuit breaker is closed.

BACKGROUND

It is generally known that when a condensive load such as a shunt capacitor is connected by a circuit breaker, a large inrush current flows depending on a closing phase.

In Japan, a series reactor whose capacity is 6% of capacitance of the capacitor is inserted to suppress the magnitude of the inrush current. However, the capacitance of the shunt capacitor increases with the increasing capacity of a system, and the inrush current tends to increase.

Outside Japan, a series reactor is not used in many cases. Therefore, an inrush current is expected to be higher than in Japan. In Japan, a neutral point of a capacitor is not grounded. However, outside Japan, the neutral point is directly grounded in most cases. Accordingly, there is expected to be a difference of phenomena by connecting/disconnecting of a capacitor bank (shunt capacitor group) between Japan and areas outside Japan.

The shunt capacitor is connected/disconnected more than once a day in response to load variations. The electrical life of the circuit breaker used to connect/disconnect the shunt capacitor is important. The electrical life of the circuit breaker is greatly affected by the wearing away of an arcing contact and a nozzle of the circuit breaker. The condition that determines the electrical life of the circuit breaker which connects/disconnects the shunt capacitor is dominated by erosion resulting from pre-arcing discharge at the time of the closing of the circuit breaker.

In order to suppress a magnetizing inrush current that flows when a transformer is energized, it is known to use a circuit breaker having a structure in which a resistor-equipped circuit breaker including a closing resistance and a contact that are connected in series is connected in parallel to a circuit breaker main contact. This circuit breaker closes the resistor-equipped circuit breaker prior to the circuit breaker main contact and thereby suppresses the magnetizing inrush current.

However, the size increase of the circuit breaker configured to have the resistor-equipped circuit breaker is inevitable. The shunt capacitor is often disposed in a power system of a voltage class of, for example, 66 or 77 kV. In these voltage classes, most circuit breakers are a three-phase collective operation type. The three-phase collective operation type circuit breaker closes all three phases at the same time. When three phases of shunt capacitors are connected at the same time, the suppression of an inrush current is difficult.

DETAILED DESCRIPTION

Hereinafter, embodiments of the invention will be described with reference to the drawings.

In general, according to one embodiment, there is provided an inrush current suppression apparatus that suppresses an inrush current generated when three phases of shunt capacitors including a directly grounded neutral point are simultaneously connected to a three-phase alternating-current electric power system on a power supply side by a circuit breaker. The inrush current suppression apparatus comprises: a power supply voltage measurement unit configured to measure a power supply voltage which is a voltage on the power supply side of the circuit breaker; a circuit breaker current measurement unit configured to measure a circuit breaker current which is a current running through the circuit breaker; a residual voltage polarity determination unit configured to determine the polarities of three phases of a residual voltage on the shunt capacitor side of the circuit breaker after the opening of the circuit breaker in accordance with the circuit breaker current measured by the circuit breaker current measurement unit; a specific phase determination unit configured to determine a specific phase having a polarity different from those of the other two phases among the polarities of the three phases of the residual voltage determined by the residual voltage polarity determination unit; a closing phase detector configured to detect a closing phase in which the power supply voltage measured by the power supply voltage measurement unit of the specific phase determined by the specific phase determination unit becomes a peak value of the same polarity as the polarity of the specific phase of the residual voltage determined by the residual voltage polarity determination unit; and a circuit breaker closing unit configured to close the circuit breaker in the closing phase detected by the closing phase detector.

(First Embodiment)

Figure 1:
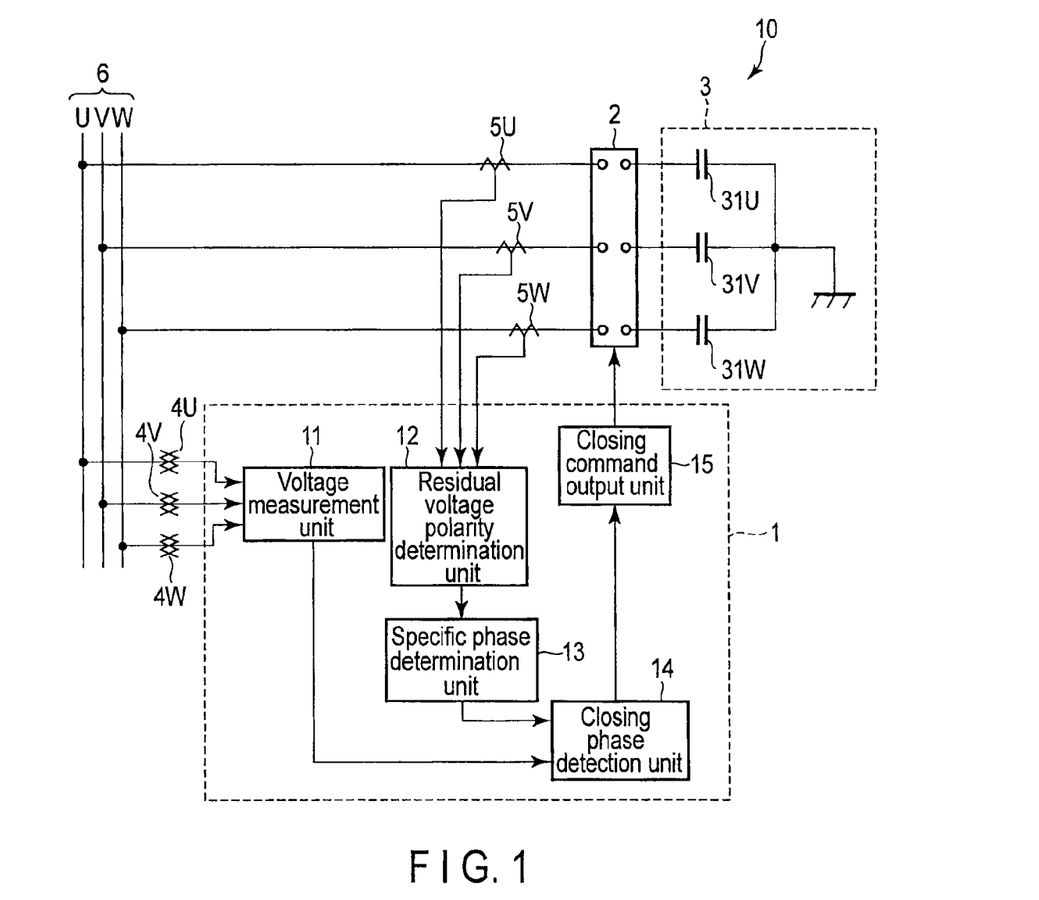
FIG. 1 is a configuration diagram showing the configuration of an electric power system to which a circuit breaker control apparatus according to a first embodiment of the invention is applied.

FIG. 1 is a configuration diagram showing the configuration of an electric power system 10 to which a circuit breaker control apparatus 1 according to a first embodiment of the invention is applied. Like parts in the following drawings are indicated by like reference signs and are not described in detail, and differences are mainly described. Repeated explanations are not given in the following embodiments either.

The electric power system 10 comprises the circuit breaker control apparatus 1, a circuit breaker 2, phase modification equipment 3, voltage detectors 4U, 4V, and 4W, current detectors 5U, 5V, and 5W, and an electric power bus 6.

The electric power bus 6 is a bus of the electric power system. Three-phase alternating-current electric power is supplied to the electric power bus 6 from an electric power supply.

The phase modification equipment 3 is connected to the electric power bus 6 via the circuit breaker 2. The phase modification equipment 3 is a condensive load. The phase modification equipment (capacitor bank) 3 comprises three shunt capacitors 31U, 31V, and 31W. The three shunt capacitors 31U, 31V, and 31W are provided in U-, V-, and W-phases, respectively. The shunt capacitors 31U, 31V, and 31W are directly grounded at a neutral point.

The circuit breaker 2 is a three-phase collective operation type circuit breaker which collectively operates three phases. When the circuit breaker 2 is closed, the phase modification equipment 3 is closed to be connected to the electric power bus 6. When the circuit breaker 2 is opened, the phase modification equipment 3 is electrically disconnected from the electric power bus 6.

The voltage detectors 4U, 4V, and 4W are measurement devices to measure, phase by phase, a circuit breaker power supply side voltage which is a voltage closer to a power supply side (the side of the electric power bus 6) than the circuit breaker 2. The voltage detectors 4U, 4V, and 4W detect, as measurement information, voltages of the U-, V-, and W-phases, respectively. The voltage detectors 4U, 4V, and 4W output the detected circuit breaker power supply side voltages to the circuit breaker control apparatus 1. The voltage detectors 4U, 4V, and 4W are instrument voltage transformers (VT) by way of example. The voltage detectors 4U, 4V, and 4W are disposed on the electric power bus 6 here, but may be disposed in any place closer to the power supply side than the circuit breaker 2.

The current detectors 5U, 5V, and 5W are measurement devices to measure, phase by phase, a circuit breaker current which is a current running through the circuit breaker 2. The current detectors 5U, 5V, and 5W detect, as measurement information, currents of the U-, V-, and W-phases, respectively. The current detectors 5U, 5V, and 5W are current transformers (CT) by way of example. The current detectors 5U, 5V, and 5W output the detected circuit breaker currents to the circuit breaker control apparatus 1. The current detectors 5U, 5V, and 5W are disposed on the power supply side here, but may be disposed closer to a load side (the side of the phase modification equipment 3) than the circuit breaker 2. When an existing circuit breaker is altered, CTs, if provided on both sides of this circuit breaker, can be used as the current detectors 5U, 5V, and 5W.

The circuit breaker control apparatus 1 is a controller to control the circuit breaker 2. The circuit breaker control apparatus 1 closes or opens the circuit breaker 2 in accordance with the circuit breaker power supply side voltages detected by the voltage detectors 4U, 4V, and 4W and the circuit breaker currents detected by the current detectors 5U, 5V, and 5W.

The circuit breaker control apparatus 1 comprises a voltage measurement unit 11, a residual voltage polarity determination unit 12, a specific phase determination unit 13, a closing phase detection unit 14, and a closing command output unit 15.

The voltage measurement unit 11 measures ground voltages (phase voltages) of the circuit breaker power supply side voltages detected by the voltage detectors 4U, 4V, and 4W. The voltage measurement unit 11 outputs the measured ground voltages of the circuit breaker power supply side voltages to the closing phase detection unit 14.

In accordance with the circuit breaker currents detected by the current detectors 5U, 5V, and 5W, the residual voltage polarity determination unit 12 estimates the polarities of direct-current voltages (residual voltages of the shunt capacitors 31U, 31V, and 31W) remaining on the load side of the circuit breaker 2 after the opening of the circuit breaker 2. The residual voltage polarity determination unit 12 outputs the estimated polarities of the residual voltages to the specific phase determination unit 13.

Figure 2:
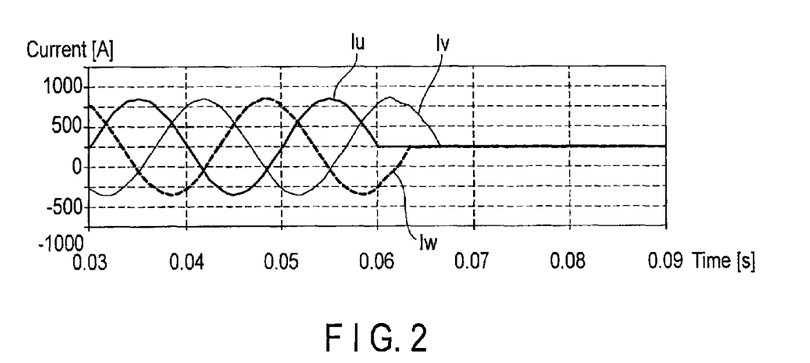
FIG. 2 is a waveform chart showing circuit breaker currents running through a circuit breaker before and after interrupting.
Figure 3:
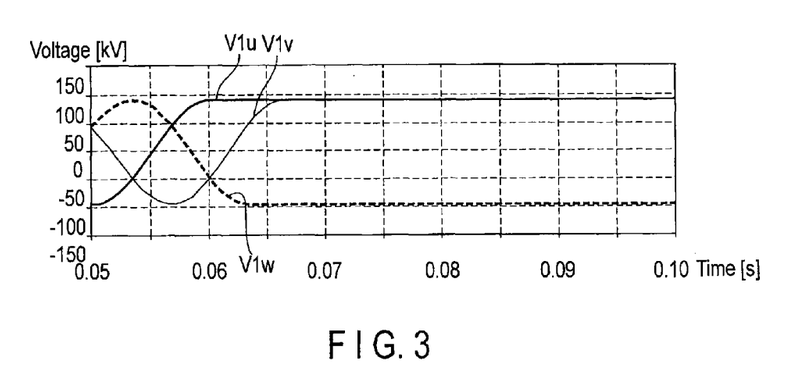
FIG. 3 is a waveform chart showing ground voltages applied to a load side of the circuit breaker before and after interrupting by the circuit breaker.

Referring to FIG. 2 and FIG. 3, how the residual voltage polarity determination unit 12 estimates the polarity of the residual voltage is described.

FIG. 2 is a waveform chart showing circuit breaker currents Iu, Iv, and Iw running through the circuit breaker 2 before and after interrupting. FIG. 3 is a waveform chart showing ground voltages V1$u$, V1$v$, and V1$w$ applied to a load side of the circuit breaker 2 before and after interrupting by the circuit breaker 2. That is, the ground voltages V1$u$, V1$v$, and V1$w$ shown in FIG. 3 after the interrupting of the circuit breaker currents Iu, Iv, and Iw shown in FIG. 2 represent the residual voltages of the shunt capacitors 31U, 31V, and 31W.

As shown in FIG. 2 and FIG. 3, the capacitor neutral point of the shunt capacitors 31U, 31V, and 31W is directly grounded, and the zero points of the circuit breaker currents of the three phases are therefore different. The U-phase is a breaking first phase. The W-phase is a breaking second phase. The V-phase is a breaking third phase.

Referring to FIG. 2, the polarity of the half wave of a U-phase circuit breaker current Iu before a breaking point (the circuit breaker current zero point) is positive. On the other hand, referring to FIG. 3, the polarity of a capacitor residual voltage (load-side ground voltage after interrupting) V1$u$ of the shunt capacitor 31U is also positive.

Similarly, referring to FIG. 2, the polarity of the half wave of a V-phase circuit breaker current Iv before the breaking point is positive. Referring to FIG. 3, the polarity of the capacitor residual voltage V1v of the shunt capacitor 31V is also positive. Referring to FIG. 2, the polarity of the half wave of a W-phase circuit breaker current Iw before the breaking point is negative. Referring to FIG. 3, the polarity of the capacitor residual voltage V1w of the shunt capacitor 31W is also negative.

Therefore, the polarities of the capacitor residual voltages V1u, V1v, and V1w of the shunt capacitors 31U, 31V, and 31W after interrupting are the same as the polarities of the half waves of the circuit breaker currents Iu, Iv, and Iw before the breaking point. This is because the phase of the current is 90 degrees ahead of the voltage when the condensive load of, for example, the capacitor is disconnected.

The residual voltage polarity determination unit 12 uses this principle to estimate the capacitor residual voltages V1u, V1v, and V1w of the shunt capacitors 31U, 31V, and 31W of the respective phases.

The specific phase determination unit 13 determines a specific phase in accordance with the polarities of the capacitor residual voltages estimated by the residual voltage polarity determination unit 12. The specific phase determination unit 13 outputs the determined specific phase and the polarity of the capacitor residual voltage of the specific phase to the closing phase detection unit 14.

Here, the specific phase refers to the phase of a polarity of the capacitor residual voltage different from the other two phases. For example, in the state shown in FIG. 3, the polarity of the capacitor residual voltage V1w of the W-phase is negative. In contrast, the polarities of the capacitor residual voltages V1u and V1v of the U- and V-phases other than the W-phase are positive. Thus, the W-phase is the specific phase.

The closing phase detection unit 14 detects a closing phase in which to close the circuit breaker 2 next, in accordance with the ground voltages of the circuit breaker power supply side voltages measured by the voltage measurement unit 11, the specific phase determined by the specific phase determination unit 13, and the polarity of the capacitor residual voltage of the specific phase. The closing phase is the phase in which the specific phase of the circuit breaker power supply side voltage becomes a peak value of the same polarity as the polarity of the specific phase of the capacitor residual voltage. The closing phase detection unit 14 outputs the detected closing phase to the closing command output unit 15.

Figure 4:
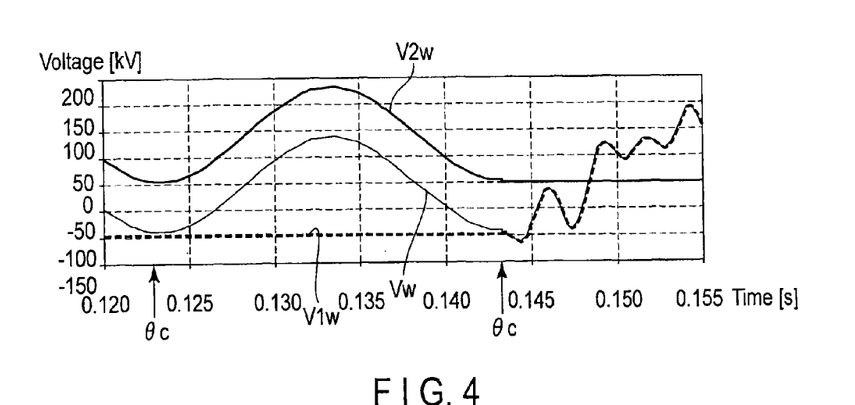
FIG. 4 is a waveform chart showing various W-phase voltages before and after the circuit breaker is closed in a closing phase by a closing phase detection unit according to the first embodiment.
Figure 5:
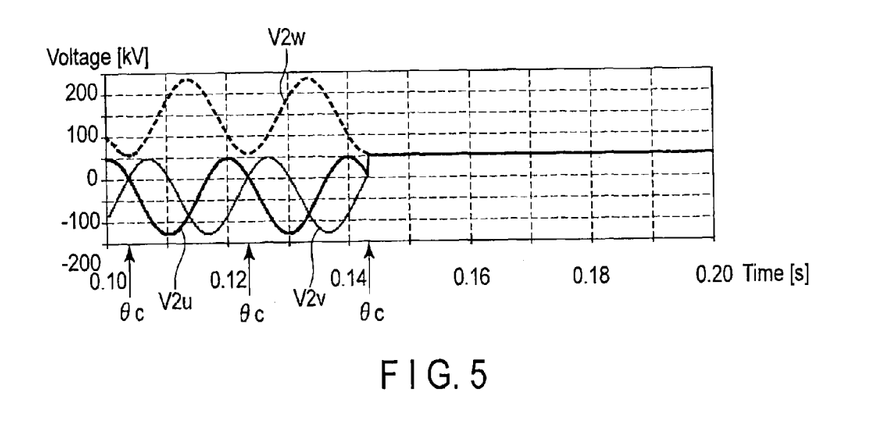
FIG. 5 is a waveform chart showing voltages accross circuit-breaker of circuit breaker power supply side voltages of phases before and after the circuit breaker is closed in a closing phase by a closing phase detection unit according to the first embodiment.

Referring to FIG. 4 and FIG. 5, how the closing phase detection unit 14 detects a closing phase θc is described.

FIG. 4 is a waveform chart showing various W-phase voltages Vw, V1w, and V2w before and after the circuit breaker 2 is closed in the closing phase θc by the closing phase detection unit 14 according to the present embodiment. FIG. 5 is a waveform chart showing voltages accross circuit-breaker V2u, V2v, and V2w of the circuit breaker power supply side voltages of the respective phases before and after the circuit breaker 2 is closed in the closing phase θc by the closing phase detection unit 14 according to the present embodiment. FIG. 4 and FIG. 5 are waveform charts in which the circuit breaker 2 is closed in the closing phase θc by the closing phase detection unit 14 after the circuit breaker 2 is opened in the state shown in FIG. 3.

As described above, the W-phase is the specific phase in the state shown in FIG. 3. Therefore, the closing phase detection unit 14 monitors the W-phase circuit breaker power supply side voltage Vw measured by the voltage measurement unit 11.

The closing phase detection unit 14 detects a phase in which the W-phase circuit breaker power supply side voltage Vw becomes a peak value of the same polarity as the polarity of the W-phase capacitor residual voltage V1w. That is, the closing phase detection unit 14 detects a phase in which the W-phase circuit breaker power supply side voltage Vw becomes a peak value of the negative polarity. The phase that allows the peak value of the negative polarity is the closing phase θc.

As shown in FIG. 4, the voltage across circuit-breaker V2w of the circuit breaker 2 in the W-phase is low in the closing phase θc. As shown in FIG. 5, the voltages accross circuit-breaker V2u and V2v of the circuit breaker 2 in the U- and V-phases other than the W-phase are also relatively low in the closing phase θc.

The closing command output unit 15 outputs a closing command to the circuit breaker 2 to close the circuit breaker 2 in the closing phase θc detected by the closing phase detection unit 14. As a result, the circuit breaker 2 is closed at a point in the closing phase θc.

According to the present embodiment, the following action and effects can be obtained.

The action and effects of the closing of the circuit breaker 2 in the closing phase θc are described with reference to FIG. 6 and FIG. 7.

Figure 6:
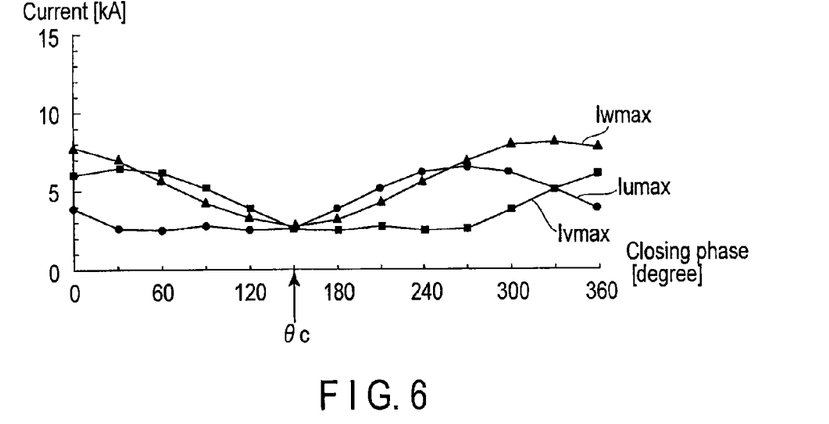
FIG. 6 is a graph showing the correlation between the closing phase and the maximum values of circuit breaker currents in the phases after closing.

FIG. 6 is a graph showing the correlation between the closing phase and the maximum values Iumax, Ivmax, and Iwmax of the circuit breaker currents in the phases after closing. FIG. 7 is a graph showing the correlation between the closing phase and the maximum values Vumax, Vvmax, and Vwmax of circuit breaker end ground voltages in the phases after closing. Horizontal axes in FIG. 6 and FIG. 7 represent the closing phase (degree) with respect to a U-phase voltage zero point. Points where the closing phase is 150 degrees (θc) in FIG. 6 and FIG. 7 correspond to the point of the closing phase θc detected by the closing phase detection unit 14 shown in FIG. 4 and FIG. 5.

Figure 7:
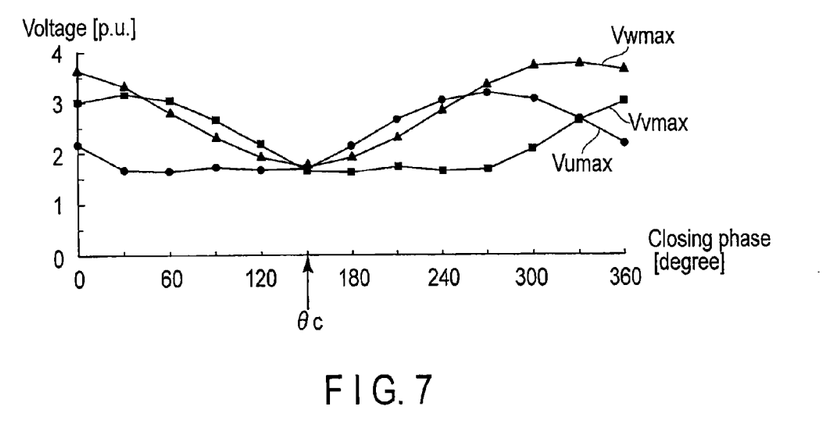
FIG. 7 is a graph showing the correlation between the closing phase and the maximum values of circuit breaker end ground voltages in the phases after closing.

FIG. 6 and FIG. 7 show calculations found when the three-phase shunt capacitors 31U, 31V, and 31W which have a ground voltage of 110 kV and a capacitor current of 400 A and which have a directly grounded neutral point are disconnected by the circuit breaker 2 and the three phases are then simultaneously closed. The closing phase is changed 360 degrees with respect to the U-phase ground voltage zero point (zero degrees).

In FIG. 6, the maximum values Iumax, Ivmax, and Iwmax of the circuit breaker currents when the circuit breaker 2 is closed in a closing phase of 150 degrees are substantially lowest in the respective phases. Conversely, the maximum values Iumax, Ivmax, and Iwmax of the circuit breaker currents when the circuit breaker 2 is closed in a closing phase of 330 degrees are higher in all the three phases than in other closing phases. If the circuit breaker 2 is closed in a closing phase of 150 degrees, the circuit breaker current is about half the circuit breaker current when the circuit breaker 2 is closed in a closing phase of 330 degrees.

In FIG. 7, the maximum values Vumax, Vvmax, and Vwmax of the circuit breaker end ground voltages when the circuit breaker 2 is closed in a closing phase of 150 degrees are substantially lowest in the respective phases. Conversely, the maximum values Vumax, Vvmax, and Vwmax of the circuit breaker end ground voltages when the circuit breaker 2 is closed in a closing phase of 330 degrees are higher in all the three phases than in other closing phase. The maximum value Vwmax of the W-phase circuit breaker end ground voltage in a closing phase of 330 degrees is about 3.5 p.u. In contrast, the maximum value Vwmax of the W-phase circuit breaker end ground voltage in a closing phase of 150 degrees is about 1.5 p.u. Thus, the maximum value Vwmax of the W-phase circuit breaker end ground voltage in a closing phase of 150 degrees is about half the value in a closing phase of 330 degrees.

Accordingly, if the circuit breaker 2 is closed in a closing phase of 150 degrees (corresponding to the closing phase θc by the circuit breaker control apparatus 1) with respect to the U-phase voltage zero point, both the circuit breaker current and the circuit breaker end ground voltage can be suppressed.

Therefore, even when the shunt capacitors 31U, 31V, and 31W having a directly grounded neutral point are connected by the three-phase collective operation type circuit breaker 2, both the circuit breaker current (inrush current) and the circuit breaker end ground voltage (surge voltage) can be suppressed by the use of the circuit breaker control apparatus 1.

In the circuit breaker control apparatus 1, the polarities of the circuit breaker currents Iu, Iv, and Iw before the breaking point are monitored to determine the polarities of the capacitor residual voltages V1u, V1v, and V1w. Consequently, the circuit breaker control apparatus 1 can close the circuit breaker 2 in a closing phase that suppresses both the circuit breaker current and the circuit breaker end ground voltage without any direct-current voltage measuring instrument provided to directly measure the capacitor residual voltages V1u, V1v, and V1w.

(Second Embodiment)

Figure 8:
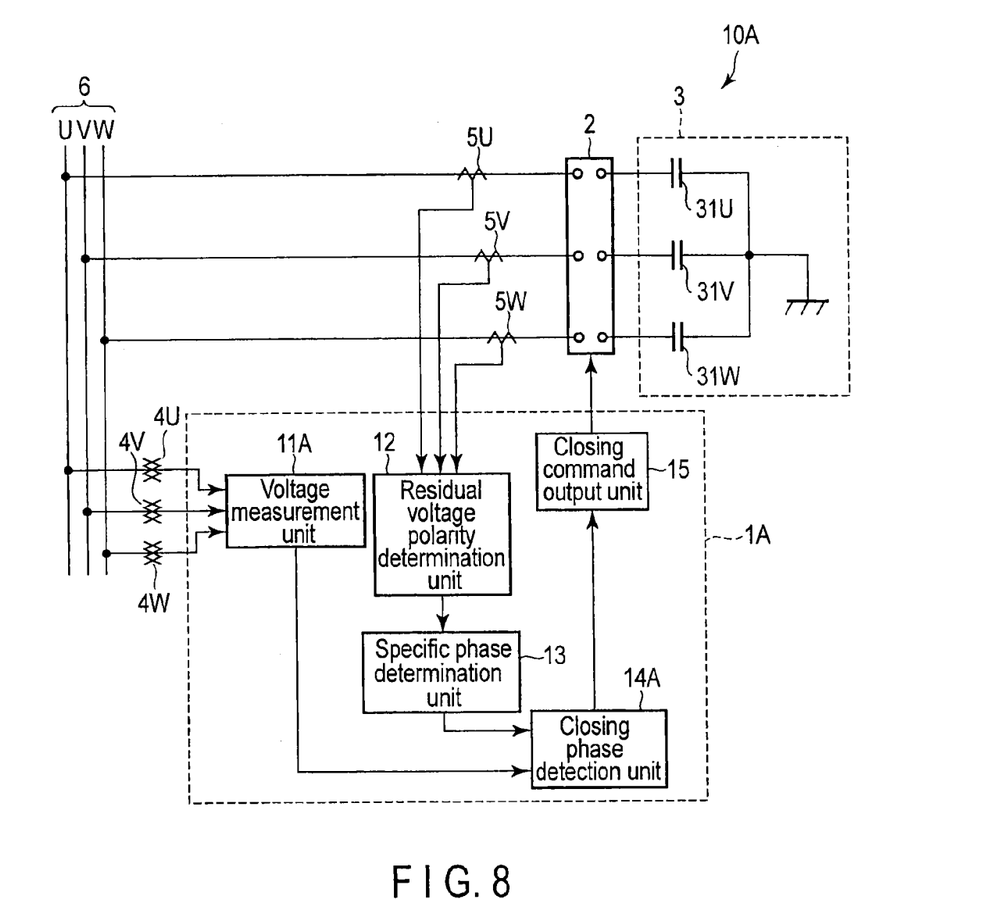
FIG. 8 is a configuration diagram showing the configuration of an electric power system to which a circuit breaker control apparatus according to a second embodiment of the invention is applied.

FIG. 8 is a configuration diagram showing the configuration of an electric power system 10A to which a circuit breaker control apparatus 1A according to a second embodiment of the invention is applied.

In the electric power system 10A, the circuit breaker control apparatus 1 in the electric power system 10 according to the first embodiment shown in FIG. 1 is replaced by the circuit breaker control apparatus 1A. In the circuit breaker control apparatus 1A, the voltage measurement unit 11 in the circuit breaker control apparatus 1 according to the first embodiment is replaced by a voltage measurement unit 11A, and the closing phase detection unit 14 in the circuit breaker control apparatus 1 is replaced by a closing phase detection unit 14A. The electric power system 10A is similar in other respects to the first embodiment.

The voltage measurement unit 11A converts ground voltages of circuit breaker power supply side voltages detected by voltage detectors 4U, 4V, and 4W to line-to-line voltages. The voltage measurement unit 11A measures the converted line-to-line voltages. The voltage measurement unit 11A outputs the measured line-to-line voltages of the circuit breaker power supply side voltages to the closing phase detection unit 14A.

The closing phase detection unit 14A detects a closing phase in which to close a circuit breaker 2 next, in accordance with the line-to-line voltages of the circuit breaker power supply side voltages measured by the voltage measurement unit 11A, the specific phase and the polarity of the capacitor residual voltage of the specific phase determined by the specific phase determination unit 13. The closing phase is included in the phase of the zero point of the circuit breaker power supply side voltage between the lines of two phases which are not specific phase. The closing phase detection unit 14A outputs the detected closing phase to the closing command output unit 15.

Figure 9:
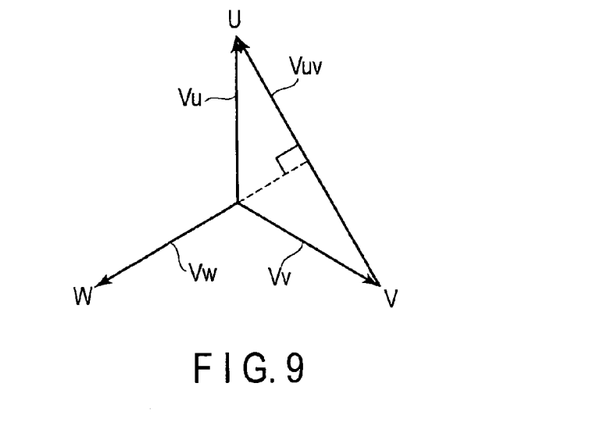
FIG. 9 is a vector diagram showing a phase relationship between a W-phase voltage and a U-V line-to-line voltage.

FIG. 9 is a vector diagram showing the phase relationship between a W-phase voltage Vw and a U-V line-to-line voltage Vuv. In the case described here, the line-to-line voltage of two phases which are not specific phases is a U-V voltage when the specific phase is the W-phase. When the line-to-line voltage of two phases which are not specific phases is a V-U voltage, the polarity is considered to be reversed as compared to the polarity of the U-V voltage, so that a similar configuration can be used and is therefore not described.

As shown in FIG. 9, the phase of the W-phase voltage Vw is 90 degrees ahead of the phase of the U-V line-to-line voltage Vuv. Therefore, the phase in which the U-V line-to-line voltage Vuv is shifted from the polarity opposite to the polarity of a W-phase capacitor residual voltage V1w to a zero point is the same as the phase in which the W-phase voltage Vw is shifted from the zero point to a peak value of the same polarity as the polarity of the W-phase capacitor residual voltage V1w. That is, the closing phase detection unit 14A detects a phase in which the U-V line-to-line voltage Vuv between the lines of two phases which are not specific phase is shifted to the zero point from the polarity opposite to the polarity of the capacitor residual voltage V1w of the W-phase which is a specific phase, thereby detecting the same phase as the closing phase θc which is detected in the first embodiment.

Figure 10:
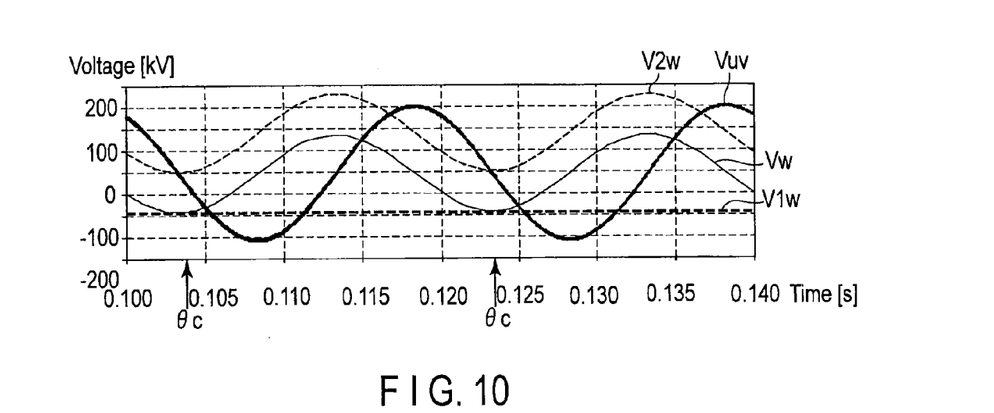
FIG. 10 is a waveform chart showing various voltages for detecting a closing phase by a closing phase detection unit according to the second embodiment.

Referring to FIG. 10, how the closing phase detection unit 14A detects the closing phase θc is described.

FIG. 10 is a waveform chart showing various voltages Vw, V1w, V2w, and Vuv for detecting the closing phase θc by the closing phase detection unit 14A according to the present embodiment.

The closing phase detection unit 14A monitors the U-V line-to-line voltage Vuv of the circuit breaker power supply side voltage measured by the voltage measurement unit 11A.

The closing phase detection unit 14A detects a phase in which the U-V line-to-line voltage Vuv of the circuit breaker power supply side voltage is shifted to the zero point from the positive polarity opposite to the polarity of the W-phase capacitor residual voltage V1w. The detected phase in which the U-V line-to-line voltage Vuv is shifted to the zero point from the positive polarity is the closing phase θc.

As shown in FIG. 10, the voltage accross circuit-breaker V2w of the circuit breaker 2 in the W-phase is lowest in the closing phase θc.

The closing command output unit 15 outputs the closing command to the circuit breaker 2 to close the circuit breaker 2 in the closing phase θc detected by the closing phase detection unit 14A. As a result, the circuit breaker 2 is closed at a point in the closing phase θc.

According to the present embodiment, the line-to-line voltages of the circuit breaker power supply side voltages are measured instead of the ground voltages of the circuit breaker power supply side voltages, so that action and effects similar to those according to the first embodiment can be obtained.

As the zero point of the line-to-line voltage of the circuit breaker power supply side voltage is detected to detect the closing phase, operation processing in the circuit breaker control apparatus 1A can be easily and correctly detected.

Third Embodiment

Figure 11:
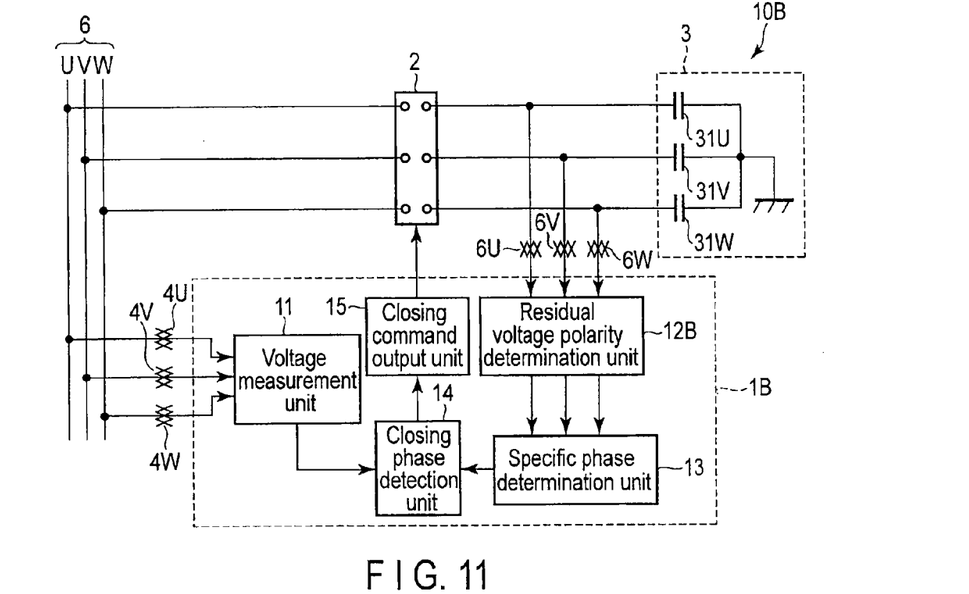
FIG. 11 is a configuration diagram showing the configuration of an electric power system to which a circuit breaker control apparatus according to a third embodiment of the invention is applied.

FIG. 11 is a configuration diagram showing the configuration of an electric power system 10B to which a circuit breaker control apparatus 1B according to a third embodiment of the invention is applied.

In the electric power system 10B, the circuit breaker control apparatus 1 in the electric power system 10 according to the first embodiment shown in FIG. 1 is replaced by a circuit breaker control apparatus 1B, and the current detectors 5U, 5V, and 5W are replaced by voltage detectors 6U, 6V, and 6W. The third embodiment is similar in other respects to the first embodiment.

The voltage detectors 6U, 6V, and 6W are measurement devices to measure, phase by phase, a load side voltage which is a voltage closer to a load side (the side of phase modification equipment 3) than the circuit breaker 2. The voltage detectors 6U, 6V, and 6W detect, as measurement information, voltages of the U-, V-, and W-phases, respectively. The voltage detectors 6U, 6V, and 6W output the detected load side voltages to the circuit breaker control apparatus 1B. The voltage detectors 6U, 6V, and 6W are instrument voltage transformers by way of example.

In the circuit breaker control apparatus 1B, the residual voltage polarity determination unit 12 in the circuit breaker control apparatus 1 according to the first embodiment is replaced by a residual voltage polarity determination unit 12B. The circuit breaker control apparatus 1B is similar in other respects to the first embodiment.

The residual voltage polarity determination unit 12B measures ground voltages of load side voltages detected by the voltage detectors 6U, 6V, and 6W. In accordance with the measured ground voltages of the load side voltages, the residual voltage polarity determination unit 12B estimates the polarities of direct-current voltages (residual voltages of shunt capacitors 31U, 31V, and 31W) remaining on the load side of the circuit breaker 2 after the opening of the circuit breaker 2. The residual voltage polarity determination unit 12B outputs the estimated polarities of the residual voltages to the specific phase determination unit 13.

The polarity of the residual voltage is estimated in the following manner.

The residual voltage polarity determination unit 12B determines the polarity of the ground voltage of the load side voltage immediately before a breaking zero point in accordance with the measured ground voltage of the load side voltage. The residual voltage polarity determination unit 12B estimates that the polarity of the residual voltage of the same phase as the ground voltage whose polarity has been determined is the same as the determined polarity. The residual voltage polarity determination unit 12B thus estimates the polarities of the residual voltages for all the phases.

According to the present embodiment, the voltage detectors 6U, 6V, and 6W for measuring the load side voltage are provided instead of the current detectors 5U, 5V, and 5W for measuring the circuit breaker currents, so that action and effects similar to those according to the first embodiment can be obtained.

(Fourth Embodiment)

Figure 12:
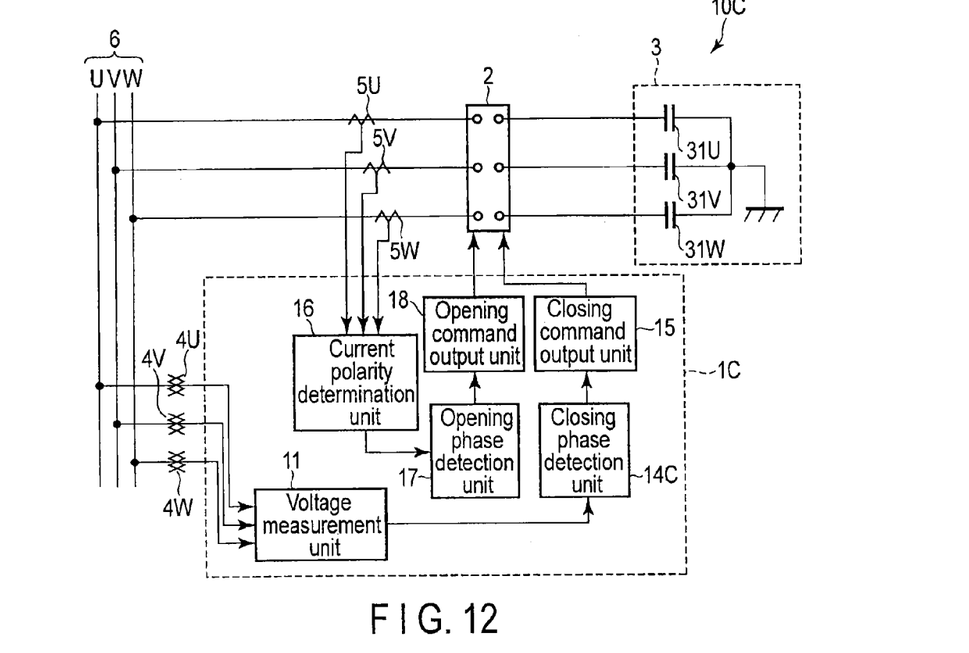
FIG. 12 is a configuration diagram showing the configuration of an electric power system to which a circuit breaker control apparatus according to a fourth embodiment of the invention is applied.

FIG. 12 is a configuration diagram showing the configuration of an electric power system 100 to which a circuit breaker control apparatus 10 according to a fourth embodiment of the invention is applied.

In the electric power system 100, the circuit breaker control apparatus 1 in the electric power system 10 according to the first embodiment shown in FIG. 1 is replaced by the circuit breaker control apparatus 1C. The electric power system 100 is similar in other respects to the first embodiment. The basic configuration of the circuit breaker control apparatus 1C is similar to that of the circuit breaker control apparatus 1 according to the first embodiment.

The circuit breaker control apparatus 10 comprises the voltage measurement unit 11, a closing phase detection unit 14C, the closing command output unit 15, a current polarity determination unit 16, an opening phase detection unit 17, and an opening command output unit 18.

The current polarity determination unit 16 determines the polarities of the phases of circuit breaker currents detected by current detectors 5U, 5V, and 5W. The current polarity determination unit 16 outputs the determined polarities of the phases of the circuit breaker currents to the opening phase detection unit 17.

The opening phase detection unit 17 detects an opening phase in which the polarities of the phases of the circuit breaker currents determined by the current polarity determination unit 16 are the same as preset polarities of the respective phases. The opening phase detection unit 17 outputs the detected opening phase to the opening command output unit 18.

The opening command output unit 18 outputs an opening command to the circuit breaker 2 so that the circuit breaker 2 interrupts a current at the point of the opening phase detected by the opening phase detection unit 17. The opening command output unit 18 opens the circuit breaker 2 in the opening phase detected by the opening phase detection unit 17 so that the polarities of the phases immediately before the opening of the circuit breaker 2 are always the same as the preset polarities of the respective phases.

The voltage measurement unit 11 outputs the measured ground voltages of the circuit breaker power supply side voltages to the closing phase detection unit 14C.

In accordance with the ground voltages of the circuit breaker power supply side voltages measured by the voltage measurement unit 11, the closing phase detection unit 14C detects a closing phase θc (or a desired closing phase range). The closing phase detection unit 14C outputs the detected closing phase to the closing command output unit 15.

Now, how the closing phase detection unit 14C detects the closing phase θc is described.

The polarities of the respective phases immediately before the opening of the circuit breaker 2 are always the same owing to the opening phase detection unit 17 and the opening command output unit 18. Therefore, after the opening of the circuit breaker 2, the polarities of the direct-current voltages (residual voltages) remaining on the load side (the phase modification equipment 3) of the circuit breaker 2 are also always the same.

The polarities of the respective phases of the residual voltage after the opening of the circuit breaker 2 are preset in the closing phase detection unit 14C. The closing phase detection unit 14C measures the circuit breaker power supply side voltages to detect the optimum closing phase θc that suppresses inrush currents and surge voltages generated when the circuit breaker 2 is closed, as in the first embodiment.

The closing command output unit 15 outputs the closing command to the circuit breaker 2 to close the circuit breaker 2 in the closing phase θc detected by the closing phase detection unit 14C.

According to the present embodiment, the polarities of the respective phases immediately before the opening of the circuit breaker 2 can be always the same owing to the opening phase detection unit 17 and the opening command output unit 18. Thus, the polarity of each phase of the residual voltage of the phase modification equipment 3 can also be a preset polarity.

Consequently, the circuit breaker control apparatus 1C can provide action and effects similar to those according to the first embodiment by controlling the closing phase θc of the circuit breaker 2 in accordance with the circuit breaker power supply side voltage without estimating the polarities of the residual voltages of the phase modification equipment 3.

(Fifth Embodiment)

Figure 13:
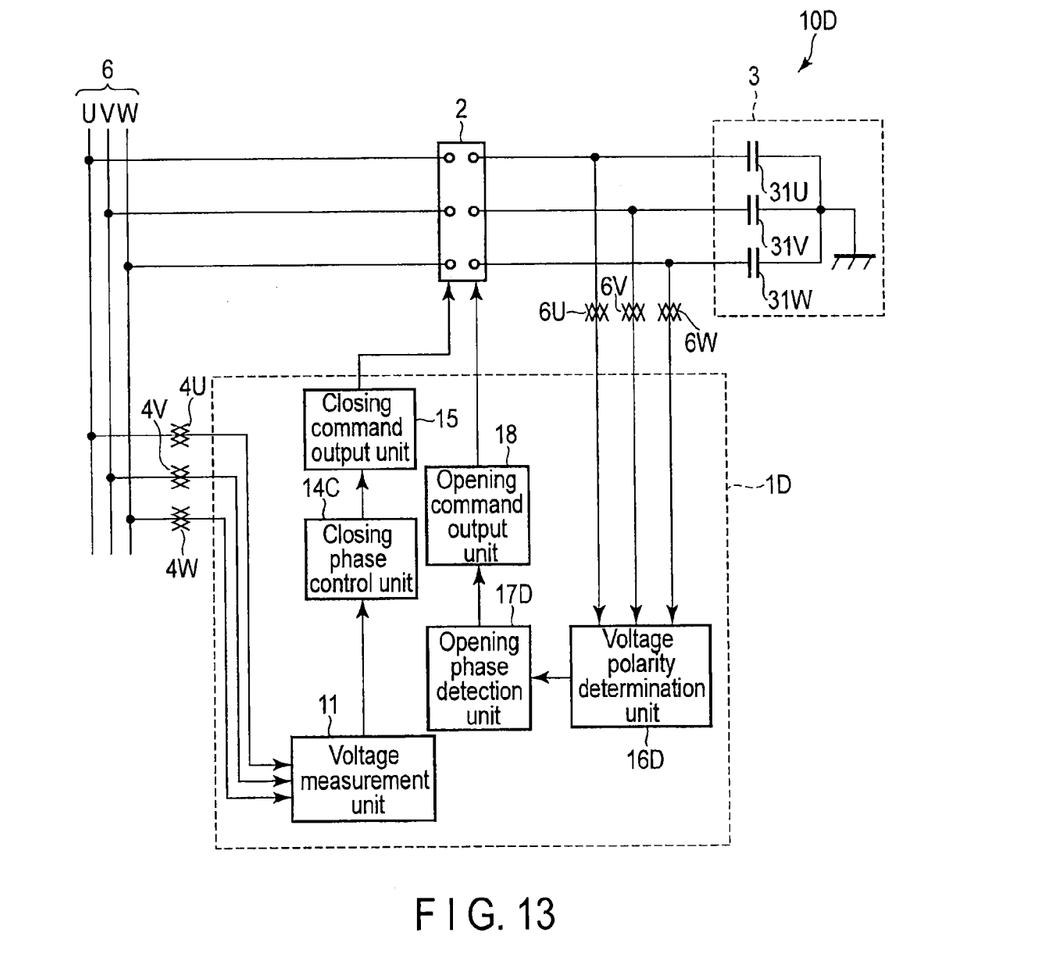
FIG. 13 is a configuration diagram showing the configuration of an electric power system to which a circuit breaker control apparatus according to a fifth embodiment of the invention is applied.

FIG. 13 is a configuration diagram showing the configuration of an electric power system 10D to which a circuit breaker control apparatus 1D according to a fifth embodiment of the invention is applied.

In the electric power system 10D, the circuit breaker control apparatus 1C in the electric power system 100 according to the fourth embodiment shown in FIG. 12 is replaced by the circuit breaker control apparatus 1D, and the current detectors 5U, 5V, and 5W are replaced by the voltage detectors 6U, 6V, and 6W according to the third embodiment. The electric power system 10D is similar in other respects to the fourth embodiment.

In the circuit breaker control apparatus 1D, the voltage polarity determination unit 16 in the circuit breaker control apparatus 10 according to the fourth embodiment shown in FIG. 12 is replaced by a voltage polarity determination unit 16D, and the opening phase detection unit 17 is replaced by an opening phase detection unit 17D. The circuit breaker control apparatus 1D is similar in other respects to the fourth embodiment.

The voltage polarity determination unit 16D measures ground voltages of load side voltages detected by the voltage detectors 6U, 6V, and 6W. The voltage polarity determination unit 16D determines the polarities of the phases of the measured load side voltages. The voltage polarity determination unit 16D outputs the determined polarities of the phases of the load side voltages to the opening phase detection unit 17D.

The opening phase detection unit 17D detects an opening phase in which the polarities of the phases determined by the voltage polarity determination unit 16D are the same as preset polarities of the respective phases. The opening phase detection unit 17D outputs the detected opening phase to the opening command output unit 18.

The opening command output unit 18 outputs the opening command to the circuit breaker 2 so that the circuit breaker 2 interrupts a current at the point of the opening phase detected by the opening phase detection unit 17D. The opening command output unit 18 opens the circuit breaker 2 in the opening phase detected by the opening phase detection unit 17D so that the opening phase of the circuit breaker 2 is always the same as the preset phase.

The operation of closing the circuit breaker 2 by the voltage measurement unit 11, the closing phase detection unit 14C, and the closing command output unit 15 is similar to that in the fourth embodiment.

According to the present embodiment, action and effects similar to those according to the fourth embodiment can also be obtained by the use of the voltage detectors 6U, 6V, and 6W instead of the current detectors 5U, 5V, and 5W.

Although the voltage detectors 4U, 4V, and 4W which detect the ground voltages are used in the embodiments, voltage detectors which detect line-to-line voltages may be used instead. In this case, the calculation for converting ground voltages to line-to-line voltages can be omitted in the embodiments that use the line-to-line voltages. In the embodiments that use the ground voltages, a configuration similar to those in the above embodiments can be used by the addition of the calculation for converting line-to-line voltages to ground voltages. Similarly, current detectors for detecting line-to-line currents may be used instead of the current detectors 5U, 5V, and 5W for detecting ground currents, and voltage detectors for detecting line-to-line voltages may be used instead of the voltage detectors 6U, 6V, and 6W for detecting ground voltages.

In the embodiments, various voltages and currents of the electric power system for detecting the closing phase θc may be measured and calculated in any way as long as the closing phase is decided by substantially the same method as the method of deciding the closing phase θc.

Although the configuration of the electric power system 10 according to the first embodiment is used as the basic configuration in the third to fifth embodiments, the configuration of the electric power system 10A according to the second embodiment may be used as the basic configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the inrush current suppression apparatus comprising:
    a power supply voltage measurement unit configured to measure a power supply voltage which is a voltage on the power supply side of the three-phase collective operation circuit breaker;
    a three-phase collective operation circuit breaker current measurement unit configured to measure a circuit breaker current which is a current running through the three-phase collective operation circuit breaker;
    a residual voltage polarity determination unit configured to determine the polarities of three phases of a residual voltage on the shunt capacitor side of the three-phase collective operation circuit breaker after the opening of the three-phase collective operation circuit breaker in accordance with the circuit breaker current measured by the three-phase collective operation circuit breaker current measurement unit;
    a specific phase determination unit configured to determine a specific phase having a polarity different from those of the other two phases among the polarities of the three phases of the residual voltage determined by the residual voltage polarity determination unit;
    a closing phase detector configured to detect a closing phase in which the power supply voltage measured by the power supply voltage measurement unit of the specific phase determined by the specific phase determination unit becomes a peak value of the same polarity as the polarity of the specific phase of the residual voltage determined by the residual voltage polarity determination unit; and
    a circuit breaker closing unit configured to close the three-phase collective operation circuit breaker in the closing phase detected by the closing phase detector.

2. An inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the inrush current suppression apparatus comprising:

a power supply voltage measurement unit configured to measure a power supply voltage which is a voltage on the power supply side of the three-phase collective operation circuit breaker;

a shunt capacitor side voltage measurement unit configured to measure a shunt capacitor side voltage which is a voltage on the shunt capacitor side of the three-phase collective operation circuit breaker;

a residual voltage polarity determination unit configured to determine the polarities of three phases of a residual voltage on the shunt capacitor side of the three-phase collective operation circuit breaker after the opening of the three-phase collective operation circuit breaker in accordance with the shunt capacitor side voltage measured by the shunt capacitor side voltage measurement unit;

a specific phase determination unit configured to determine a specific phase having a polarity different from those of the other two phases among the polarities of the three phases of the residual voltage determined by the residual voltage polarity determination unit;

a closing phase detector configured to detect a closing phase in which the power supply voltage measured by the power supply voltage measurement unit of the specific phase determined by the specific phase determination unit becomes a peak value of the same polarity as the polarity of the specific phase of the residual voltage determined by the residual voltage polarity determination unit; and a circuit breaker closing unit configured to close the three-phase collective operation circuit breaker in the closing phase detected by the closing phase detector.

3. An inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the inrush current suppression apparatus comprising:

a power supply voltage measurement unit configured to measure a power supply voltage which is a voltage on the power supply side of the three-phase collective operation circuit breaker;

a three-phase collective operation circuit breaker current measurement unit configured to measure a circuit breaker current which is a current running through the three-phase collective operation circuit breaker;

a residual voltage polarity determination unit configured to determine the polarities of three phases of a residual voltage on the shunt capacitor side of the three-phase collective operation circuit breaker after the opening of the three-phase collective operation circuit breaker in accordance with the circuit breaker current measured by the three-phase collective operation circuit breaker current measurement unit;

a specific phase determination unit configured to determine a specific phase having a polarity different from those of the other two phases among the polarities of the three phases of the residual voltage determined by the residual voltage polarity determination unit;

a closing phase detection unit configured to detect a closing phase to suppress the inrush current out of the phases in which a line-to-line voltage, of the power supply voltage measured by the power supply voltage measurement unit, of the other two phases different from the specific phase determined by the specific phase determination unit becomes a zero point; and a circuit breaker closing unit configured to close the three-phase collective operation circuit breaker in the closing phase detected by the closing phase detector.

4. An inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the inrush current suppression apparatus comprising:

a power supply voltage measurement unit configured to measure a power supply voltage which is a voltage on the power supply side of the three-phase collective operation circuit breaker;

a shunt capacitor side voltage measurement unit configured to measure a shunt capacitor side voltage which is a voltage on the shunt capacitor side of the three-phase collective operation circuit breaker;

a residual voltage polarity determination unit configured to determine the polarities of three phases of a residual voltage on the shunt capacitor side of the three-phase collective operation circuit breaker after the opening of the three-phase collective operation circuit breaker in accordance with the shunt capacitor side voltage measured by the shunt capacitor side voltage measurement unit;

a specific phase determination unit configured to determine a specific phase having a polarity different from those of the other two phases among the polarities of the three phases of the residual voltage determined by the residual voltage polarity determination unit;

a closing phase detector configured to detect a closing phase to suppress the inrush current out of the phases in which a line-to-line voltage, of the power supply voltage measured by the power supply voltage measurement unit, of the other two phases different from the specific phase determined by the specific phase determination unit becomes a zero point; and a circuit breaker closing unit configured to close the three-phase collective operation circuit breaker in the closing phase detected by the closing phase detector.

5. An inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the inrush current suppression apparatus comprising:

a power supply voltage measurement unit configured to measure a power supply voltage which is a voltage on the power supply side of the three-phase collective operation circuit breaker;

a circuit breaker current measurement unit configured to measure a circuit breaker current which is a current running through the three-phase collective operation circuit breaker;

an opening phase detector configured to detect, in accordance with the three-phase collective operation circuit breaker current measured by the circuit breaker current measurement unit, an opening phase in which the polarities of three phases of a residual voltage on the shunt capacitor side of three-phase collective operation circuit breaker after the opening of the three-phase collective operation circuit breaker are the same as preset polarities of respective phases;

a circuit breaker opening unit configured to open the three-phase collective operation circuit breaker in the opening phase detected by the opening phase detector;

a closing phase detector configured to detect a closing phase in which the power supply voltage measured by the power supply voltage measurement unit of a specific phase having a polarity different from those of the other two phases among the preset polarities of the phases becomes a peak value of the same polarity as the polarity of the specific phase of the residual voltage; and a circuit breaker closing unit configured to close the three-phase collective operation circuit breaker in the closing phase detected by the closing phase detector.

6. An inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the inrush current suppression apparatus comprising:

a power supply voltage measurement unit configured to measure a power supply voltage which is a voltage on the power supply side of the three-phase collective operation circuit breaker;

a shunt capacitor side voltage measurement unit configured to measure a shunt capacitor side voltage which is a voltage on the shunt capacitor side of the three-phase collective operation circuit breaker;

an opening phase detector configured to detect, in accordance with the shunt capacitor side voltage measured by the shunt capacitor side voltage measurement unit, an opening phase in which the polarities of three phases of a residual voltage on the shunt capacitor side of the three-phase collective operation circuit breaker after the opening of the three-phase collective operation circuit breaker are the same as the preset polarities of respective phases;

a circuit breaker opening unit configured to open the three-phase collective operation circuit breaker in the opening phase detected by the opening phase detector;

a closing phase detector configured to detect a closing phase in which the power supply voltage measured by the power supply voltage measurement unit of a specific phase having a polarity different from those of the other two phases among the preset polarities of the phases becomes a peak value of the same polarity as the polarity of the specific phase of the residual voltage; and a circuit breaker closing unit configured to close the three-phase collective operation circuit breaker in the closing phase detected by the closing phase detector.

7. An inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the inrush current suppression apparatus comprising:

a power supply voltage measurement unit configured to measure a power supply voltage which is a voltage on the power supply side of the three-phase collective operation circuit breaker;

a three-phase collective operation circuit breaker current measurement unit configured to measure a circuit breaker current which is a current running through the three-phase collective operation circuit breaker;

an opening phase detector configured to detect, in accordance with the three-phase collective operation circuit breaker current measured by the three-phase collective operation circuit breaker current measurement unit, an opening phase in which the polarities of three phases of a residual voltage on the shunt capacitor side of the three-phase collective operation circuit breaker after the opening of the three-phase collective operation circuit breaker are the same as the preset polarities of respective phases;

a circuit breaker opening unit configured to open the three-phase collective operation circuit breaker in the opening phase detected by the opening phase detector;

a closing phase detector configured to detect a closing phase to suppress the inrush current out of the phases in which a line-to-line voltage, of the power supply voltage measured by the power supply voltage measurement unit, of the other two phases different from a specific phase having a polarity different from those of the other two phases among the preset polarities of the phases becomes a zero point; and a circuit breaker closing unit configured to close three-phase collective operation circuit breaker in the closing phase detected by the closing phase detector.

8. An inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the inrush current suppression apparatus comprising:

a power supply voltage measurement unit configured to measure a power supply voltage which is a voltage on the power supply side of the three-phase collective operation circuit breaker;

a shunt capacitor side voltage measurement unit configured to measure a shunt capacitor side voltage which is a voltage on the shunt capacitor side of the three-phase collective operation circuit breaker;

an opening phase detector configured to detect, in accordance with the shunt capacitor side voltage measured by the shunt capacitor side voltage measurement unit, an opening phase in which the polarities of three phases of a residual voltage on the shunt capacitor side of the three-phase collective operation circuit breaker after the opening of the three-phase collective operation circuit breaker are the same as the preset polarities of respective phases;

a circuit breaker opening unit configured to open the three-phase collective operation circuit breaker in the opening phase detected by the opening phase detector;

a closing phase detector configured to detect a closing phase to suppress the inrush current out of the phases in which a line-to-line voltage, of the power supply voltage measured by the power supply voltage measurement unit, of the other two phases different from a specific phase having a polarity different from those of the other two phases among the preset polarities of the phases becomes a zero point; and a circuit breaker closing unit configured to close the three-phase collective operation circuit breaker in the closing phase detected by the closing phase detector.

9. A method of controlling an inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the method comprising:
- measuring a power supply voltage which is a voltage on the power supply side of the three-phase collective operation circuit breaker;
- measuring a circuit breaker current which is a current running through the three-phase collective operation circuit breaker;
- determining the polarities of three phases of a residual voltage on the shunt capacitor side of the three-phase collective operation circuit breaker after the opening of the three-phase collective operation circuit breaker in accordance with the measured circuit breaker current;
- determining a specific phase having a polarity different from those of the other two phases among the polarities of the three phases of the determined residual voltage;
- detecting a closing phase in which the measured power supply voltage of the specific phase becomes a peak value of the same polarity as the polarity of the specific phase of the determined residual voltage; and
- closing the three-phase collective operation circuit breaker in the detected closing phase.

10. A method of controlling an inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the method comprising:
- measuring a power supply voltage which is a voltage on the power supply side of the three-phase collective operation circuit breaker;
- measuring a shunt capacitor side voltage which is a voltage on the shunt capacitor side of the three-phase collective operation circuit breaker;
- determining the polarities of three phases of a residual voltage on the shunt capacitor side of the three-phase collective operation circuit breaker after the opening of the three-phase collective operation circuit breaker in accordance with the measured shunt capacitor side voltage;
- determining a specific phase having a polarity different from those of the other two phases among the polarities of the three phases of the determined residual voltage;
- detecting a closing phase in which the measured power supply voltage of the specific phase becomes a peak value of the same polarity as the polarity of the determined specific phase of the residual voltage; and
- closing the three-phase collective operation circuit breaker in the detected closing phase.

11. A method of controlling an inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the method comprising:
- measuring a power supply voltage which is a voltage on the power supply side of the three-phase collective operation circuit breaker;
- measuring a circuit breaker current which is a current running through the three-phase collective operation circuit breaker;
- determining the polarities of three phases of a residual voltage on the shunt capacitor side of the three-phase collective operation circuit breaker after the opening of the three-phase collective operation circuit breaker in accordance with the measured circuit breaker current;
- determining a specific phase having a polarity different from those of the other two phases among the polarities of the three phases of the determined residual voltage;
- detecting a closing phase to suppress the inrush current out of the phases in which a line-to-line voltage, of the measured power supply voltage, of the other two phases different from the specific phase becomes a zero point; and
- closing the three-phase collective operation circuit breaker in the detected closing phase.

12. A method of controlling an inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the method comprising:
- measuring a power supply voltage which is a voltage on the power supply side of the three-phase collective operation circuit breaker;
- measuring a shunt capacitor side voltage which is a voltage on the shunt capacitor side of the three-phase collective operation circuit breaker;
- determining the polarities of three phases of a residual voltage on the shunt capacitor side of the three-phase collective operation circuit breaker after the opening of the three-phase collective operation circuit breaker in accordance with the measured shunt capacitor side voltage;
- determining a specific phase having a polarity different from those of the other two phases among the polarities of the three phases of the determined residual voltage;
- detecting a closing phase to suppress the inrush current out of the phases in which a line-to-line voltage, of the measured power supply voltage, of the other two phases different from the specific phase becomes a zero point; and
- closing the three-phase collective operation circuit breaker in the detected closing phase.

13. A method of controlling an inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the method comprising:
- measuring a power supply voltage which is a voltage on the power supply side of the three-phase collective operation circuit breaker;
- measuring a circuit breaker current which is a current running through the three-phase collective operation circuit breaker;
- detecting, in accordance with the measured circuit breaker current, an opening phase in which the polarities of three phases of a residual voltage on the shunt capacitor side of the three-phase collective operation circuit breaker after the opening of the three-phase collective operation circuit breaker are the same as the preset polarities of respective phases;

opening the three-phase collective operation circuit breaker in the detected opening phase;

detecting a closing phase in which the measured power supply voltage of a specific phase having a polarity different from those of the other two phases among the preset polarities of the phases becomes a peak value of the same polarity as the polarity of the specific phase of the residual voltage; and closing the three-phase collective operation circuit breaker in the detected closing phase.

14. A method of controlling an inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the method comprising:

measuring a power supply voltage which is a voltage on the power supply side of the three-phase collective operation circuit breaker;

measuring a shunt capacitor side voltage which is a voltage on the shunt capacitor side of the three-phase collective operation circuit breaker;

detecting, in accordance with the measured shunt capacitor side voltage, an opening phase in which the polarities of three phases of a residual voltage on the shunt capacitor side of the three-phase collective operation circuit breaker after the opening of the three-phase collective operation circuit breaker are the same as the preset polarities of respective phases;

opening the three-phase collective operation circuit breaker in the detected opening phase;

detecting a closing phase in which the measured power supply voltage of a specific phase having a polarity different from those of the other two phases among the preset polarities of the phases becomes a peak value of the same polarity as the polarity of the specific phase of the residual voltage; and closing the three-phase collective operation circuit breaker in the detected closing phase.

15. A method of controlling an inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the method comprising:

measuring a power supply voltage which is a voltage on the power supply side of the three-phase collective operation circuit breaker;

measuring a circuit breaker current which is a current running through the three-phase collective operation circuit breaker;

detecting, in accordance with the measured circuit breaker current, an opening phase in which the polarities of three phases of a residual voltage on the shunt capacitor side of the three-phase collective operation circuit breaker after the opening of the three-phase collective operation circuit breaker are the same as the preset polarities of respective phases;

opening the three-phase collective operation circuit breaker in the detected opening phase;

detecting a closing phase to suppress the inrush current out of the phases in which a line-to-line voltage, of the measured power supply voltage, of the other two phases different from a specific phase having a polarity different from those of the other two phases among the preset polarities of the phases becomes a zero point; and closing the three-phase collective operation circuit breaker in the detected closing phase.

16. A method of controlling an inrush current suppression apparatus that suppresses an inrush current generated when three phases of shunt capacitors including a directly grounded neutral point are simultaneously connected to a three-phase alternating-current electric power system on a power supply side by a three-phase collective operation circuit breaker which collectively operates three phases, the method comprising:

measuring a power supply voltage which is a voltage on the power supply side of the three-phase collective operation circuit breaker;

measuring a shunt capacitor side voltage which is a voltage on the shunt capacitor side of the three-phase collective operation circuit breaker;

detecting, in accordance with the measured shunt capacitor side voltage, an opening phase in which the polarities of three phases of a residual voltage on the shunt capacitor side of the three-phase collective operation circuit breaker after the opening of the three-phase collective operation circuit breaker are the same as the preset polarities of respective phases;

opening the three-phase collective operation circuit breaker in the detected opening phase;

detecting a closing phase to suppress the inrush current out of the phases in which a line-to-line voltage, of the measured power supply voltage, of the other two phases different from a specific phase having a polarity different from those of the other two phases among the preset polarities of the phases becomes a zero point; and closing the three-phase collective operation circuit breaker in the detected closing phase.

* * * * *